United States Patent

[11] 3,593,738

[72] Inventor Achilles Baerfuss
 Oberwil, Switzerland
[21] Appl. No. 854,690
[22] Filed Sept. 2, 1969
[45] Patented July 20, 1971
[73] Assignee Aktiengesellschaft Fur Biologische
 Verfahrenstechnik
 Basel, Switzerland
[32] Priority Sept. 5, 1968
[33] Switzerland
[31] 13348/68

[54] ELECTROMAGNETIC INJECTION VALVE
 5 Claims, 3 Drawing Figs.
[52] U.S. Cl. .................................................. 137/209,
 251/129, 251/282
[51] Int. Cl. ..................................................... B67d 5/54,
 F16k 31/02

[50] Field of Search ........................................... 250/129,
 130; 137/209; 251/282; 222/504

[56] References Cited
 UNITED STATES PATENTS
 3,245,651 4/1966 Erickson ....................... 137/129

Primary Examiner—Alan Cohan
Attorney—Werner W. Kleeman

ABSTRACT: An electromagnetic injection valve in which a valve in a valve chamber is connected to and actuated by movable parts located in a pressure housing. The movable parts include bias means to bias the valve in its closed position, and are all subject to the same pneumatic pressure. With this arrangement, electromagnetic means which actuate the valve are only required to exert the force necessary to overcome the bias applied by the bias means to open the valve, irrespective of the pressure subsisting in the valve chamber.

3,593,738

ELECTROMAGNETIC INJECTION VALVE

BACKGROUND OF THE INVENTION

The present invention relates to an electromagnetic injection valve with a valve chamber comprising an inlet aperture and an outlet aperture for a medium to be injected which medium is subjected to a gas pressure, the valve also comprising a valve stem passing through the wall of the valve chamber, the valve body of the valve stem resting, when the valve is closed, on the valve seat provided in the outlet aperture, and provided with a magnetizable armature at the end furthest away from the valve body so that the valve stem is displaceable against the force of a spring by the action of a solenoid arranged externally of the valve chamber, the valve chamber at the point of passage of the stem being sealed with a corrugated diaphragm. If such a valve is connected to a pressure supply, an increased pressure, as compared with the external pressure, will prevail in the valve chamber, said pressure acting on the valve stem and thus on the spring closing the valve. The solenoid must act counter to the force of this spring which for example will keep the valve closed, in order to raise the valve stem which is provided with the magnetizable armature, from the valve seat. If it is desired to operate the same valve with an elevated injection pressure the spring may no longer be able to maintain the valve in a closed position under certain circumstances so that a spring with an elevated elastic constant, i.e. a stronger spring, has to be employed. A spring with an elevated elastic constant will under certain circumstances require a different solenoid so that the valve can be opened against the force of the spring. Both the spring and the solenoid must be adapted to each other if the valve is to operate reliably. As a result it is often necessary to keep a stock of several springs and several solenoids adapted to these springs for one valve.

SUMMARY OF THE INVENTION

According to the present invention there is provided an electromagnetic injection valve comprising an inlet and an outlet provided in a valve chamber which retains a medium to be injected by means of pneumatic pressure derived from a pneumatic pressure source connectable to the valve chamber, a pressure chamber connectable to said pneumatic pressure source, a valve member seating on said outlet and connected to a support member which extends from the valve chamber into the pressure chamber, resilient means in the pressure chamber arranged to bias the valve member to close the outlet, solenoid means arranged to actuate the support member to open said outlet, the arrangement being such that, when in use, the solenoid means need only overcome the effect of said resilient means to open said outlet.

BRIEF DESCRIPTION OF THE DRAWINGS

The aforegoing and further features of the present invention will now be described with reference to the accompanying drawings, in which.

DETAILED DESCRIPTION OF AN EMBODIMENT

Figure 1:
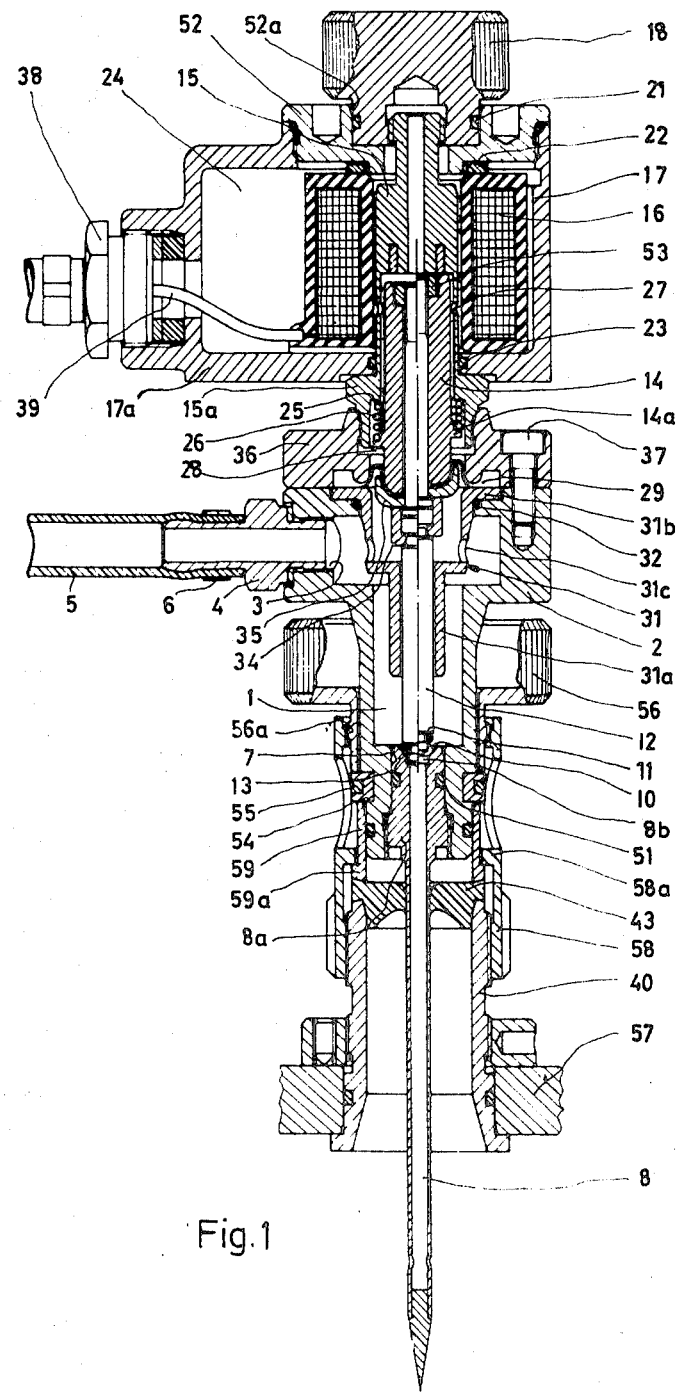
FIG. 1 illustrates in elevation a section through an electromagnetic injection valve, the closed and open positions of the valve are illustrated to the left and right of the center line respectively.

The drawings illustrate an electromagnetic injection valve according to the invention comprising a valve chamber 1 which is enclosed by a valve housing 2. An inlet aperture 3, which is provided in the valve housing 2, is provided with a screw thread for retaining an inlet tube 4 having a corresponding screw thread. A supply 5 is fastened to the inlet tube 4 by means of a hose clamp 6.

Figure 2:
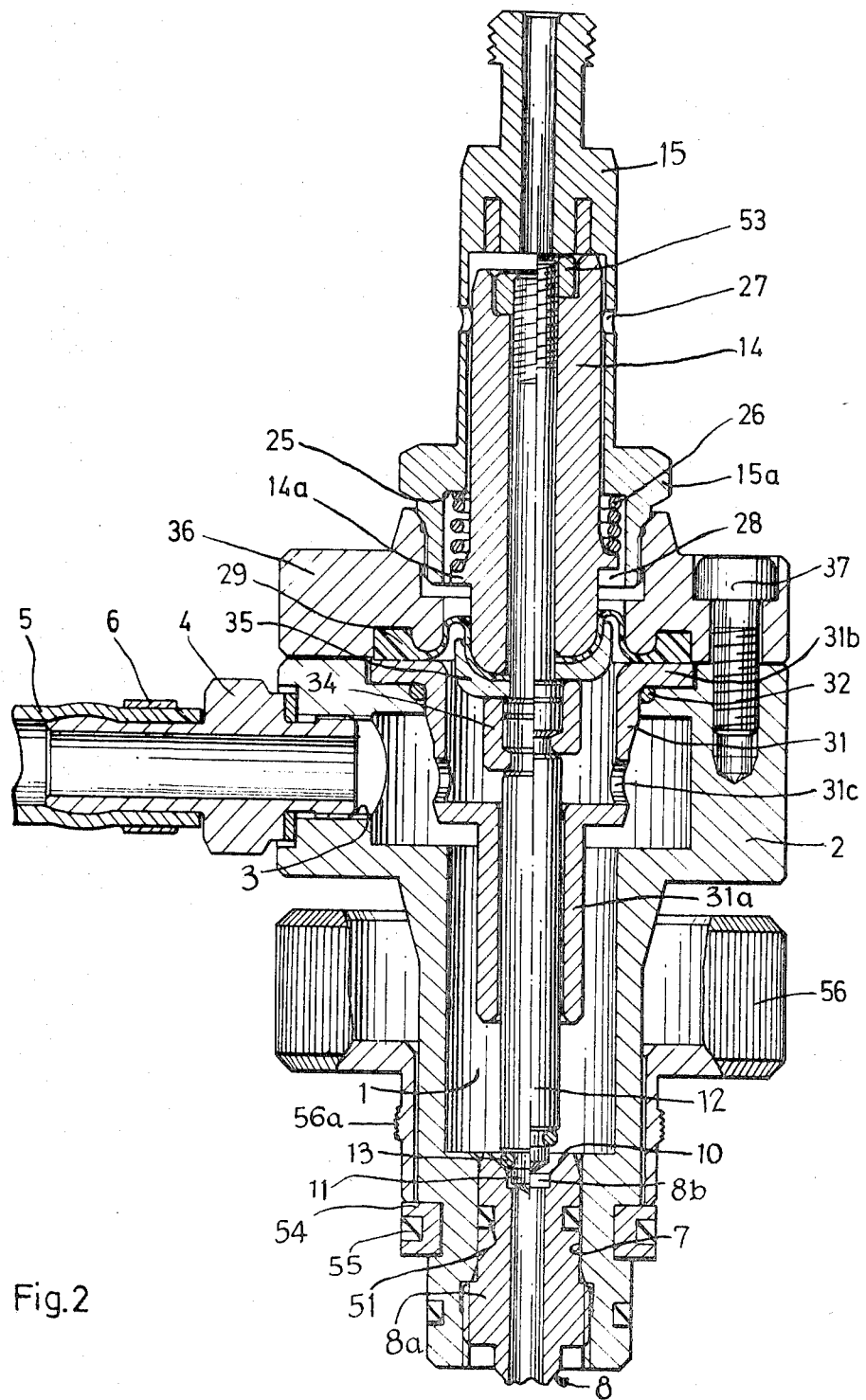
FIG. 2 illustrates an enlarged section of FIG. 1.

A socket 8a for retaining the needle valve 8 is screwed into the aperture 7 of housing 2 and provided with a seal 51. The needle valve 8 is provided with a bore 8b which forms an outlet aperture of the valve housing 2. As is illustrated at the left-hand half of the drawing of FIGS. 1 and 2, the outlet aperture may be closed by a valve body 11. Closing of the outlet aperture is effected by means of a sealing ring 13 seated in a groove of valve body 11 resting on a valve seat 10. A magnetizable armature 14 and the valve body 11 are connected to opposite ends of a valve stem 12. The magnetizable armature is fastened to the valve stem 12 by means of a threaded nut 53 so as to be displaceable therewith in an insert 15. The insert 15 in turn is threaded into an intermediate piece 36 which is fastened to the valve housing by means of screws 37. A pressure housing 17 is pushed on to the insert 15 and encloses a solenoid 16. The insert 15 passes through the whole pressure housing 17 and has a collar portion 15a at one end near the valve chamber 1. A flange 17a of the pressure housing 17 rests on the said collar portion 15a. The pressure housing 17, which is provided with pneumatic pressure connecting means 38 and an electric connecting cable 39, is also provided with a threaded cover 52 with a central aperture 52a. The aperture 52a is closed by means of a cap 18 which screws on to the insert 15 and which at the same time retains the pressure housing 17. Sealing elements 21, 22 and 23 ensure the required degree of sealing. The insert 15, which is hollow, has a portion with the largest internal diameter at the end facing the valve chamber 1, thereby forming an abutment 25. The magnetizable armature 14 has an abutment flange 14a on which rests the lower end of a spring 26, the upper end of which rests on abutment 25. The central portion of the insert 15 has two transverse apertures 27 which connect the pressure chamber 24 of the pressure housing 17 with a hollow cylindrical space 28. The space 28 is defined by the internal surface of insert 15 and the surface of the armature 14, and is separated from the valve chamber 1 by a corrugated diaphragm 29 so that the medium to be injected cannot penetrate from valve chamber 1 into the space 28 and thus into the pressure chamber 24. The valve stem 12 is guided in the valve chamber 1 by means of a sleeve 31a of a guiding element 31. An upper rim 31b of the guiding element 31 rests in the valve housing 2 and is provided with two apertures 31c. An O-ring 32 is provided between the guiding element 31 and the valve housing 2. The corrugated diaphragm 29 is forced by the magnetizable armature 14 against an inner surface of a cup-shaped element 35. The cup-shaped element 35 is retained on the stem 12 by means of a retaining element 34. The diaphragm 29 extends beyond the rim of the cup, its edge being clamped between the intermediate piece 36 and an upper rim 31b of the guiding element 31.

The valve housing 2 is provided with an abutment ring 54, having a seal 55 against. A freely rotatable sleeve 56, which rests on the ring 54 and encloses the valve housing 2, is provided with an external thread 56a. The sleeve 56 is intended to retain the valve when inserted into a support attachment 40 of a container. The support attachment 40 is inserted rigidly in the lid of the container 57. A tube 58 is screwed over the attachment 40. The external thread 56a of the sleeve is then screwed into the tube 58. The annular abutment 58a provided in the internal wall of the tube 58 rests on an external ridge 59a of a sleeve 59. The sleeve 59, together with the attachment 40, retains a membrane 43. The membrane 43 consists of a material which may be perforated by the needle 8 and which will close again after the needle 8 has been withdrawn.

Figure 3:
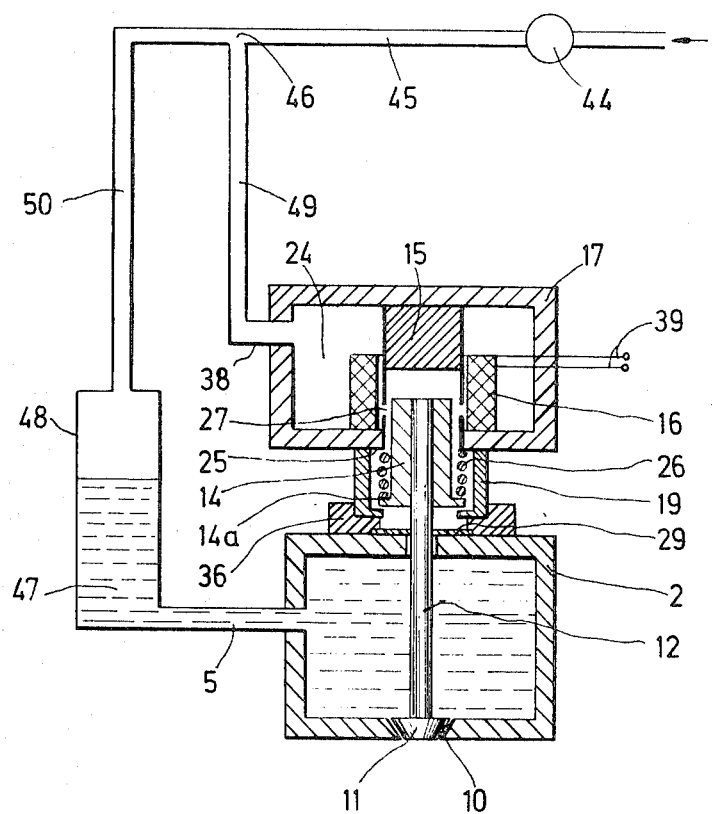
FIG. 3 illustrates diagrammatically the electromagnetic injection valve of FIGS. 1 and 2 connected to pressure supplies.

FIG. 3 shows schematically such an injection valve with the associated supply pipes. A reducing valve 44, which is connected to a compressed air container (not shown), is connected to a supply pipe 45. The supply pipe 45 branches at a junction 46 from which a supply pipe 49 leads to the supply-connecting means 38. A supply pipe 50 leads from the junction 46 to the container 48. The container 48 is filled with the medium to be injected 47 and is connected to an inlet pipe 5.

When the injection valve is connected to the associated supply means, all movable parts arranged externally of the valve chamber 1 which include the stem 21 with its magnetizable armature 14 and spring 26, are exposed to the same pressure and the spring may therefore actuate the valve independently of the injection pressure. The magnetic field produced in solenoid 16, i.e. the current flowing in the electric connecting cable 39, must be of such a magnitude that the stem can be moved against the force of spring 26. Since now the spring actuates the valve independently of the injection pressure, a solenoid will suffice which is adapted to the spring.

In order to clean and sterilize such a valve, the pressure housing 17 may be removed by unscrewing cap 18 and removing the housing 17, which rests with its bottom 17a on the ridge 15a over the insert 15.

I claim:

1. An electromagnetic injection valve comprising
   a valve chamber,
   an inlet and outlet aperture provided in the valve chamber for a medium to be injected and being subjected to pressure,
   a valve stem passing through the wall of the valve chamber,
   a valve seat provided in the outlet aperture,
   a valve body of the said valve stem resting, when the valve is closed, on the valve seat,
   a magnetizable armature provided on the valve stem at an end thereof removed from the valve body,
   a solenoid acting on said armature and arranged externally of the valve chamber,
   resilient means acting on said valve stem so that the valve stem is displaced against the force of the resilient means under the action of the solenoid,
   the valve chamber at the point where the stem passes through it being sealed off by means of a corrugated diaphragm, all the movable parts arranged externally of the valve chamber being accommodated in a pressure housing,
   a pneumatic supply acting on the medium to be injected, means independent of said inlet connecting said pneumatic source to said pressure housing and to the side of the diaphragm opposite the valve chamber so that the movable parts are subjected to the same pressure and thus the solenoid may actuate the valve independently of the injection pressure in the valve chamber.

2. An electromagnetic injection valve as defined in claim 1, wherein the solenoid is arranged in the pressure housing and the pressure housing is removable.

3. An electromagnetic injection valve as defined in claim 1, comprising a sleeve in the valve chamber surrounding said valve stem,
   a partly hollow insert within the solenoid surrounding said magnetizable armature,
   an abutment ring on said magnetizable armature, a portion of enlarged internal diameter in said partly hollow insert at the end thereof facing the valve chamber to form a further abutment, and
   a spring providing said resilient means retained between said abutment ring and said further abutment.

4. An electromagnetic injection valve as defined in claim 3, comprising
   an external collar on said partly hollow insert at the end thereof facing the valve chamber, a wall of the pressure housing resting on said collar, and
   a threaded cap on said partly hollow insert at the end thereof remote from the valve chamber, said threaded cap retaining said pressure housing on said partly hollow insert.

5. An electromagnetic injection valve as defined in claim 3, comprising at least one transverse aperture provided in a hollow cylindrical portion of said partly hollow insert,
   a space defined by the internal surface of said partly hollow insert and by the surface of the magnetizable armature,
   said transverse aperture connecting the pressure chamber to said space.